US008527798B2

(12) United States Patent
Kastl et al.

(10) Patent No.: US 8,527,798 B2
(45) Date of Patent: Sep. 3, 2013

(54) ENERGY-SAVING CIRCUIT FOR A PERIPHERAL DEVICE, PERIPHERAL DEVICE, SWITCHING DEVICE AND METHOD OF OPERATION

(75) Inventors: Peter Kastl, Schrobenhausen (DE); Ottwald Markel, Augsburg (DE); Stephan Hornung, Langenneufnach (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 323 days.

(21) Appl. No.: 12/900,570

(22) Filed: Oct. 8, 2010

(65) Prior Publication Data

US 2011/0109371 A1    May 12, 2011

(30) Foreign Application Priority Data

Nov. 12, 2009 (DE) .......................... 10 2009 052 947

(51) Int. Cl.
*G06F 3/00* (2006.01)
(52) U.S. Cl.
USPC ............................ 713/324; 713/320; 710/18
(58) Field of Classification Search
USPC ................... 713/300, 320, 323–324; 710/15, 710/18
See application file for complete search history.

(56) References Cited

U.S. PATENT DOCUMENTS

| | | | | |
|---|---|---|---|---|
| 6,119,194 A * | 9/2000 | Miranda et al. | | 710/306 |
| 6,363,491 B1 * | 3/2002 | Endo | | 713/310 |
| 6,427,183 B1 * | 7/2002 | Seidenberg | | 710/316 |
| 6,816,976 B2 * | 11/2004 | Wright et al. | | 713/323 |
| 7,904,625 B1 * | 3/2011 | Jiang et al. | | 710/110 |
| 2003/0070103 A1 | 4/2003 | Kim | | |
| 2005/0262367 A1 * | 11/2005 | Shih | | 713/323 |
| 2006/0062030 A1 * | 3/2006 | Keller | | 363/78 |
| 2007/0242300 A1 | 10/2007 | Inai | | |
| 2009/0259866 A1 * | 10/2009 | Ito et al. | | 713/323 |
| 2010/0095145 A1 * | 4/2010 | Chan et al. | | 713/324 |

FOREIGN PATENT DOCUMENTS

| | | |
|---|---|---|
| DE | 197 32 675 | 4/1999 |
| DE | 10 2007 052 880 | 5/2009 |
| JP | 4-155418 A | 5/1992 |
| JP | 2001-88631 A | 4/2001 |
| JP | 2004-94852 A | 3/2004 |
| JP | 2006-171868 | 6/2006 |
| JP | 2007-288532 | 11/2007 |
| JP | 2008-257690 A | 10/2008 |
| JP | 2009-15752 A | 1/2009 |
| JP | 2009-176190 | 8/2009 |

OTHER PUBLICATIONS

"3-Wire Interface Full-Speed USB Transceivers With/Without Internal Series Resistors". MAX13342E/MAX13345E. Revision 0. 2006. Maxim Integrated Products. pp. 1-18.*

* cited by examiner

*Primary Examiner* — Thomas J Cleary
(74) *Attorney, Agent, or Firm* — DLA Piper LLP (US)

(57) ABSTRACT

An energy-saving circuit applies to a peripheral device for connection to a data bus of a host system. The energy-saving circuit includes a monitoring circuit for monitoring a communication via the data bus, a holding circuit for holding a connection state of the peripheral device, at least one switching element for interrupting a supply voltage for the peripheral device, and a control circuit. The control circuit is set up to recognize by means of the monitoring circuit the beginning of an idle state of the data bus, to hold the connection state of the peripheral device by activation of the holding circuit upon recognition of the idle state, and to interrupt the feeding of a supply voltage for the peripheral device by opening the at least one switching element.

17 Claims, 6 Drawing Sheets

ENERGY-SAVING CIRCUIT FOR A PERIPHERAL DEVICE, PERIPHERAL DEVICE, SWITCHING DEVICE AND METHOD OF OPERATION

RELATED APPLICATIONS

This application claims priority of German Patent Application No. 10 2009 052 947.0 filed Nov. 12, 2009, the subject matter of which is incorporated herein by reference.

TECHNICAL FIELD

This disclosure relates to an energy-saving circuit for a peripheral device for connection to a data bus of a host system. It further relates to a peripheral device and a switching device for a data bus with such an energy-saving circuit, as well as a method of operation for such an energy-saving circuit.

BACKGROUND

Peripheral devices for connection to a data bus of a host system are widely known. Examples of such peripheral devices are external disk drives, printers or scanners that are connected to a host adapter of a computer system. In other fields of technology as well, however, peripheral devices are connected via data buses. Examples of these are consumer electronics or telecommunication electronic devices.

Many peripheral devices have a power supply of their own for supplying the peripheral device with an operating voltage. The result of this is that the peripheral devices generally continued to be supplied with energy even after a host system is switched off. Both the peripheral device itself and the power supply unit used for supplying the peripheral device cause power to be lost. This power loss generally consists to a large extent of losses from switching converters of the power supply unit.

DE 10 2007 052 880 discloses an electronic power supply unit that has a control unit which disconnects voltage-converting elements of a power supply from a primary-side AC voltage as a function of a power requirement of an electronic device connected thereto. Thus, the consumption of electric power in a standby state of the peripheral device can be largely avoided by the known circuit.

The solution according to prior art has the disadvantage, however, that under certain circumstances, an undesired deactivation of the peripheral device takes place when its power consumption declines, without a communication with the host system being interrupted. Under certain conditions, this leads to an error message in a host system connected to the peripheral device if the peripheral device is unexpectedly no longer accessible via a data bus. In addition, data losses can also occur in this case, particularly in the addressing of mass storage media.

It could therefore be helpful to provide an energy-saving circuit for a peripheral device for connection to a data bus of the host system, which circuit reduces power consumption of the peripheral device in a standby state without disrupting a communication of the data bus.

In addition, it could be helpful to provide a peripheral device, a switching device and an operating method that are suitable for use with the energy-saving circuit.

SUMMARY

We provide an energy saving circuit for a peripheral device that connects to a data bus of a host system, including a monitoring circuit that monitors a communication via the data bus, a holding circuit that holds a connection state of the peripheral device, at least one switching element that interrupts a supply voltage for the peripheral device, and a control circuit that recognizes by means of the monitoring circuit a beginning of an idle state of the data bus to hold the connection state of the peripheral device by activating the holding circuit upon recognition of the idle state, and interrupt the feeding of a supply voltage for the peripheral device by opening the at least one switching element.

We also provide a peripheral device including a terminal that couples the peripheral device to a host system, at least one system component that provides a device function of the peripheral device in an operating state, and an energy saving circuit arranged electrically between the terminal and the system component.

We also provide a switching device for data bus for switching a data transmission from a host system to a peripheral device including at least one first terminal that couples the switching device to the host system, at least one second terminal that couples the switching device to the peripheral device, and at least one energy saving circuit arranged electrically between the first terminal and the second terminal.

We further provide an operating method for an energy saving circuit arranged between a host system and a peripheral device including determining a connection state of the peripheral device, recognizing an idle state of the data bus by monitoring the data bus, holding the connection state of the peripheral device by providing a control signal for the host system, and disconnecting a power supply line assigned to the peripheral device by opening at least one switching element.

LIST OF REFERENCE NUMBERS

1 Host system
2 Peripheral device
3 Energy-saving circuit
4 First data cable
5 Second data cable
6 First switching element
7 Monitoring circuit
8 Holding circuit
9 Control circuit
10 Switching converter
11 Energy store
12 First terminal 13 Second terminal
14 Power grid connection
15 Switching output
16 Resistor
17 Transistor
18 Second switching element
19 Microcontroller
20 Interruption circuit
21 Third switching element
22 Power supply unit
23 Control output
24 Converter circuit
25 Supply line
26 Control line
27 Switching device
28 Bus line

DETAILED DESCRIPTION

We provide an energy-saving circuit for a peripheral device for connection to a data bus of a host system, wherein the energy-saving circuit has a monitoring circuit for monitoring communication via the data bus, a holding circuit for holding a connection state of the peripheral device, and at least one switching element for interrupting a supply voltage for the peripheral device. The energy-saving circuit further comprises a control circuit that recognizes with the monitoring circuit a beginning of an idle state of the data bus and, upon recognition of the idle state, to hold the connection state of the peripheral device by activation of the holding circuit and to interrupt the feeding of the supply voltage for the peripheral device by opening the at least one switching element.

By holding a communication state of the peripheral device with a holding circuit, the appearance of a bus disconnection can be suppressed for the host system even during an idle state of the data bus. The energy-saving circuit also takes on the function of maintaining a connection state during the idle state of the data bus so that the peripheral device can be disconnected from the feeding of the supply voltage via the data bus without interfering with the communication.

The control circuit may further recognize an end of an idle state of the data bus with the monitoring circuit. Upon recognition of an end of the idle state, the control circuit restores the feeding of the supply voltage for the peripheral device by closing the at least one switching element and releases the connection state of the peripheral device by deactivating the holding circuit. The operating state that was present before the beginning of the idle state can be restored by the additional recognition of an end of the idle state and the reconnection of the peripheral device to the supply voltage, as well as the deactivation of the holding circuit.

The host system may transfer data via the data bus with at least a first and a second speed. The connection state of the peripheral device determines whether the peripheral device is set up for a data transmission at the first or the second speed. The data bus comprises at least one first data line and one second data line, and the holding circuit holds the first data line at a predetermined voltage level if the peripheral device is set up for a data transmission at the first speed and to hold the second data line at a predetermined voltage level if the peripheral device is set up for data transmission at the second speed. Such a configuration of the energy-saving circuit makes it possible to again connect the peripheral device to the data bus after disconnection from a supply voltage and to exchange data with the host system at a previously determined speed, without a new initialization of the peripheral device or the host system being necessary.

The energy-saving circuit is particularly suited for installation in a peripheral device or a switching device for data bus.

We also provide an operating method for an energy-saving circuit arranged between a host system and a peripheral device, with the following steps:
determination of a connection state of the peripheral device;
determination of an idle state of the data bus by monitoring the data bus;
holding the connection state of the peripheral device by providing a control signal for the host system; and
disconnecting a power supply line assigned to the peripheral device by opening at least one switching element.

Additional advantageous configurations are disclosed in the extensive description below. The invention will be described in detail on the basis of examples with reference to the appended figures.

Figure 1:
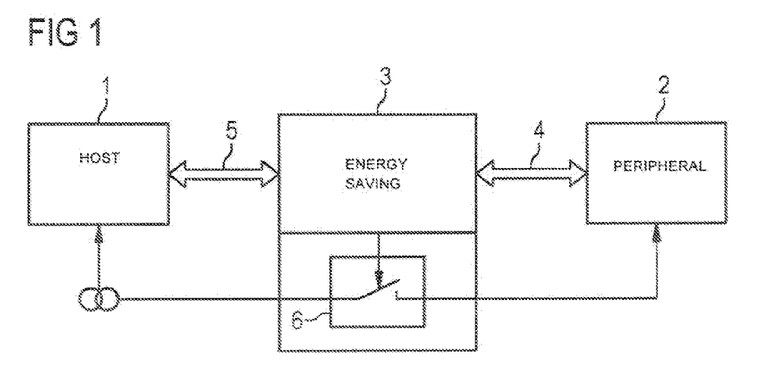
FIG. 1 shows a first arrangement comprising a peripheral device, an energy-saving circuit and a host system.

FIG. 1 shows a first arrangement comprising a host system 1, a peripheral device 2 as well as an energy-saving circuit 3 connected between the host system 1 and the peripheral device 2.

The host system 1 is, for example, a desktop PC. The peripheral device 2 is a printer connected by a serial data bus to a host adapter of the host system 1. The peripheral device 2 is connected with a first data cable 4 to the energy-saving circuit 3. The energy-saving circuit 3 is connected with a second data cable 5 to the host system 1. Thus, the energy-saving circuit 3 is connected electrically between the host system 1 and the peripheral device 2 and can monitor a communication via the data bus.

The energy-saving circuit 3 comprises a first switching element 6 in the form of a relay. The first switching element 6 is arranged between a power supply grid that provides a grid AC voltage and the peripheral device 2. By opening the first switching element 6, the energy-saving circuit 3 can disconnect the peripheral device 2 completely from the power supply network.

Figure 2:
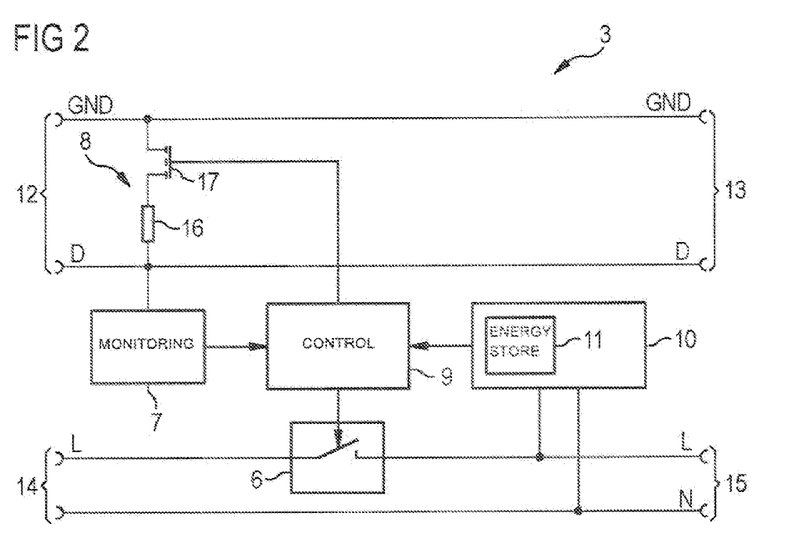
FIG. 2 shows a schematic representation of a first energy-saving circuit for the arrangement according to FIG. 1.

FIG. 2 shows a schematic representation of the energy-saving circuit 3. The energy-saving circuit 3 comprises, in addition to the first switching element 6 for disconnection of a phase line L, a monitoring circuit 7 and a holding circuit 8. In addition, the energy-saving circuit 3 comprises a control circuit 9 that controls the monitoring circuit 7, the holding circuit 8 and the first switching element 6. The energy-saving circuit 6 further comprises a switching converter 10 and an energy store 11.

As is evident from FIG. 2, a data line D and a reference line GND of the data bus are looped through the energy-saving circuit 3. Signals that arrive at a first terminal 12 of the deactivated energy-saving circuit 3 are also available at the second terminal 13, at which the peripheral device 2 is connected. A primary-side power grid terminal 14 for connection of the energy-saving circuit 3 to a power supply grid is connected via the first switching element 6 to a switching output 15 of the energy-saving circuit 3. The power supply of the peripheral device 2 is connected to the switching output 15.

The monitoring circuit 7 is set up to monitor a signaling on the data line D of the data bus. The monitoring circuit 7 recognizes whether data is being exchanged between the peripheral device 2 and the host system 1, or whether the bus system is in an idle state in which either no data at all or a predetermined control signal that indicates the idle state is being transferred. If the presence of such an idle state is recognized by the monitoring circuit 7, it generates a corresponding control signal for the control circuit 9.

The control circuit 9 recognizes the control signal supplied by the monitoring circuit 7 and causes a disconnection of the peripheral device 2 from the bus system without disrupting the host system 1. The data line D is first connected for this purpose to the reference line GND by a so-called "pull-down resistor" 16 and a transistor 17. For example, the data line D is drawn via the pull-down resistor 16 to a ground potential of the reference line GND.

The pull-down resistor 16 replaces a termination of the data bus by the peripheral device 2. Upon recognition of an idle state of the bus system via the monitoring circuit 7, the control circuit 9 therefore first pulls the data line D to the potential of the reference line GND and then opens the first switching element 6, so that the peripheral device 2 is disconnected from the power supply grid and does not consume any further energy from the power supply grid during the idle state of the bus system.

At the end of the idle state, the control circuit 9 again activates the peripheral device 2 in a manner that is transparent to the host system 1. The control circuit 9 first activates the peripheral device 2 for this purpose by closing the first switching element 6. During a predetermined warm-up time, which the peripheral device 2 needs to return to a normal operating state, the transistor 17 continues to be driven by the control circuit 9. If the peripheral device 2 is again completely ready for operation, the control signal for the transistor 17 is interrupted by the control circuit 9 and thus the data line D is disconnected from the reference line GND. Then there is again an undisturbed communication between the peripheral device 2 and the host system 1 via the data line D.

The data bus according to FIG. 2 does not comprise a line for providing a supply voltage. To supply the control circuit 9 as well as the connected holding circuit 8 and the monitoring circuit 7 with an operating energy, the energy-saving circuit 3 comprises an additional switching converter 10 that generates a DC voltage for supplying the components of the energy-saving circuit 3 from a grid-side AC voltage. The switching converter 10 is arranged downstream of the first switching element 6 to also optimize the energy consumption of the energy-saving circuit 3. Thus, the switching converter 10 is also disconnected from the power supply grid in the idle state of the bus system. To continue to ensure the functioning of the control circuit 9, the energy store 11, for example, a rechargeable battery or capacitor with a high storage capacity, stores sufficient electrical energy to supply the control circuit 9 with operating energy for a predetermined standby time, for instance, one hour after activation of the idle state.

Figure 3:
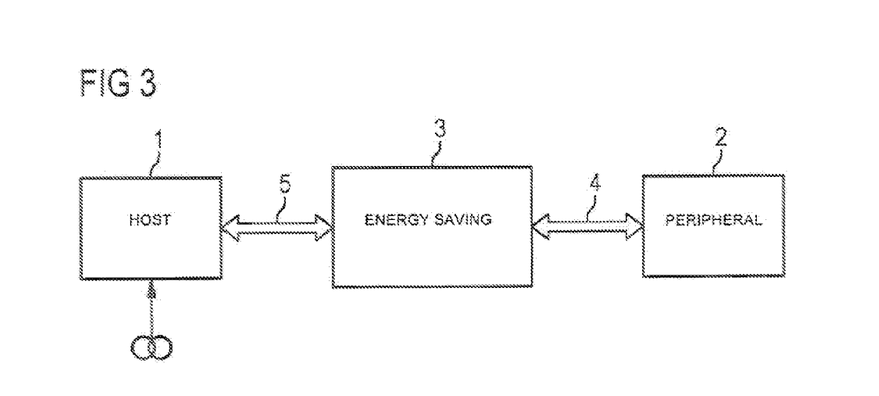
FIG. 3 shows a second arrangement comprising a peripheral device, an energy-saving circuit and a host system.

FIG. 3 shows an alternative example comprising a host system 1, a peripheral device 2 and an energy-saving circuit 3. In this example, the host system 1 and the peripheral device 2 are again connected via a serial bus, in this case a USB bus with an integrated voltage supply line. The peripheral device 2 is supplied with an operating voltage via the USB bus. In FIG. 3, only the host system 1 is connected to a power supply grid.

Figure 4:
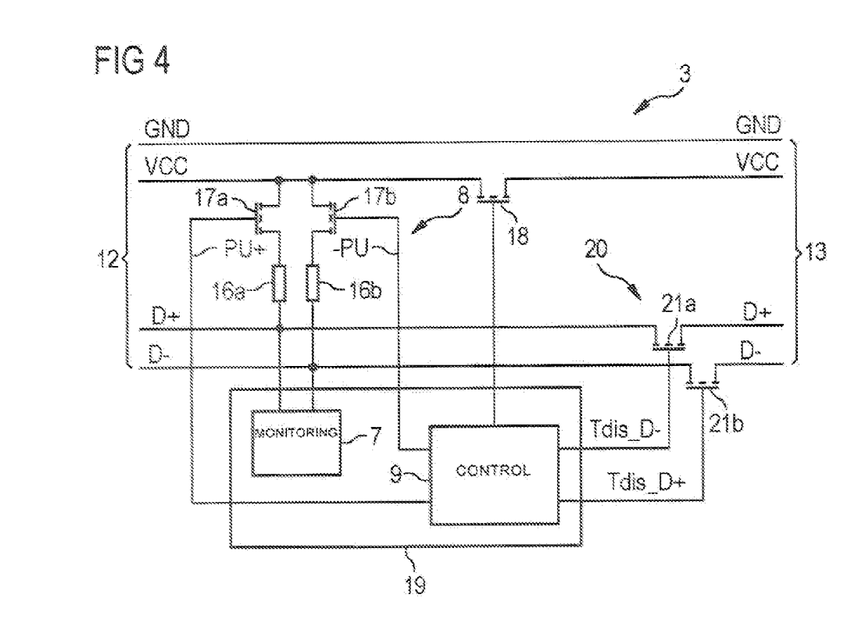
FIG. 4 shows a schematic representation of a second energy-saving circuit for the second arrangement according to FIG. 3.

FIG. 4 shows a schematic representation of the structure of the energy-saving circuit 3 for the USB bus system according to FIG. 3. Both a first terminal 12 and a second terminal 13 of the energy-saving circuit 3 each comprise two differential data lines D+ and D− as well as two supply lines VCC and GND. These lines are looped through the energy-saving circuit 3, wherein the supply line VCC can be cut off by a second switching element 18. The second switching element 18 is a field-effect transistor.

The energy-saving circuit according to FIG. 4 likewise has a monitoring circuit 7, a control circuit 9 and a holding circuit 8. The monitoring circuit 7 and the control circuit 9 are integrated into a shared microcontroller 19. Of course, a discrete configuration of the monitoring circuit 7 and the control circuit 9 is also possible. The holding circuit 8 comprises a first transistor 17*a* and a second transistor 17*b* for respectively connecting the first data line D+ via a first resistor 16*a* to the supply line VCC, and the second data line D− via a second resistor 16*b* to the supply line VCC.

The energy-saving circuit 3 has an optional interruption circuit 20. The interruption circuit 20 comprises two third switching elements 21*a* and 21*b*, by which the data lines D+ and D− can be cut off between the first terminal 12 and the second terminal 13. Thereby leakage currents in the direction of a peripheral device 2 connected to the second terminal 13 can be prevented. By cutting off the data lines D+ and D− with the interruption circuit 20, it is also possible for a data transmission between the peripheral device 2 and the host system 1 to be suppressed even if the peripheral device 2 is supplied with an operating voltage by an external power supply unit. In this manner it is possible, in particular, to avoid the waking up of the host system 1 by the peripheral device 2.

In FIG. 4, the microcontroller 19 is supplied via the power supply lines VCC with an operating voltage. This is not shown in FIG. 4, however, for reasons of clarity. According to the USB specification, a so-called "full" power or "low" power peripheral device can draw 500 μA or 2.5 mA of power, respectively, via the supply line in the so-called "suspend" state. This is sufficient for operating the microcontroller 19.

The monitoring circuit 7 monitors the data bus containing the data lines D+ and D− in the operation of the energy-saving circuit 3. In addition to monitoring a signaling of the beginning or end of an idle state of the data bus, the monitoring circuit 7 also monitors an operating mode of a peripheral device 2 connected to the second terminal 13.

After an initialization phase, the so-called "USB Device Enumeration," an idle state on the USB bus is initiated in the normal operating state of the host system 1 such as the ACPI state S0 of the operating system in case the USB peripheral device 2 is not being used. Thereby the peripheral device 2 is put into the suspend state. This can also be achieved by a global or selective suspend command of the host system 1. In the change of the host system 1 into an energy-saving state, for example, one of the ACPI states S3, S4 or S5, a suspend command is also sent by the host system 1.

As soon as the host system 1 signals an idle state to the peripheral device 2, the latter must initiate a suspend state within 3 ms. Each USB peripheral device 2 must immediately react to USB commands from the host system 1 independently of whether it is a global suspend, a selective suspend command or a signaling of an idle state. Use of these energy-saving modes can be improved by optimized drivers and software running on the host system 1.

Depending on whether the USB peripheral device 2 is a low-speed (LS), a full-speed (FS) or a high-speed device (HS), so-called "keep-alive" signals are generally sent via the USB bus. In each 125 μs-long μ-frame in the high-speed operating mode or each 1 ms-long frame in the low- or full-speed operating mode, only an SOF (start of frame) token is sent, which prevents the entry into the suspend state. Any other USB bus activity also automatically prevents entry into the suspend mode.

Upon recognition of the constant idle state by the so-called "upstream" port, i.e., the host system 1 or a higher-level USB hub, USB peripheral devices 2 must transition into the suspend state within 3 ms. After a further 10 ms, the peripheral device 2 may only consume the suspend current established by the standard from the USB bus. In the suspend state, the peripheral device 2 must continue to provide a voltage via the data line D+ in the high- or full-speed operating mode, and via the data line D− in the low-speed operating mode, so that the idle state can be maintained. For this purpose, the supply line VCC is connected via a so-called "pull-up" resistor to the corresponding data line D+ or D−. Together with the upstream host system 1 or USB hub, this ensures the correct compliance with the USB specification There are additional requirements for the suspend for high-speed peripheral devices 2 since a reset and an idle cannot be unambiguously distinguished in high-speed peripheral devices 2. High-speed peripheral devices must therefore switch from the high-speed operating mode into the full-speed operating mode after 3 ms and at the latest after 3.125 ms. For this purpose, a reception circuit is disconnected from the differential data lines D+ and D− and the data line D+ is connected to the supply line VCC via a pull-up resistor of the peripheral device 2. The peripheral device 2 must monitor the lines D+ and D− not less than 100 μs after, and not more than 875 μs is after, the change into the full-speed operating mode. As soon as the line signals an FS J, i.e., a high logic level of more than 200 mV on the data line D+ and a low logic level on the data line D−, the peripheral device 2 remains in the suspend state. However, if an SE0 start of packet, i.e., a transition from the idle into the so-called K state, is recognized, then this requires a reset signal for resetting the peripheral device 2, which is then initiated.

As described above, USB devices indicate by a pull-up of the data lines D+ or D− whether they are operating in the high- or full-speed mode or in the low-speed mode in an idle state. Before the peripheral device 2 is shut off, the current bus state is recognized and emulated by connecting the corresponding pull-up resistor 16a or 16b of the holding circuit 8. For this purpose, the control circuit 9 activates, upon recognizing an idle state via the monitoring circuit 7, either the first transistor 17a for signaling a device with a full-speed operating mode, or the second transistor 17b for signaling a low-speed operating mode. This prevents the host system 1 from seeing a bus disconnection when the peripheral device 2 shuts off, and a new connection with the bus system, which would otherwise be signaled to the operating system of the host system 1, when it turns back on.

As soon as the peripheral device 2 is in the suspend state, the energy-saving circuit 3 reacts and controls the second switching element 18 in such a manner that the power supply to the peripheral device 2 is interrupted. Even bus-fed peripheral devices 2 can be disconnected from the supply voltage by disconnection of the supply line VCC without a host system 1 connected to the first terminal 12 noticing deactivation of the peripheral device 2. The data lines D+ and D− are optionally also disconnected via the interruption circuit 20.

For a peripheral device 2 to return from the suspend state, it must be awakened by a so-called "resume" sequence. A peripheral device 2 begins the resume as soon as a bus (non-idle) state different from the idle state is present at the upstream port. So-called "wakeup-capable" USB peripheral devices 2 can also awaken the host system 1 from the suspend state.

The host system 1 is authorized at any time to send the resume sequence (TDRSMDN), which is on the bus for at least 20 ms. The host system must terminate the resume sequence by two different end sequences, depending on the device speed. For full- and low-speed USB peripheral devices 2, a low-speed EOP (End of Packet: two low-speed bit periods of singled-ended SE0, followed by a J state) is signaled. If the peripheral device was in the high-speed operating mode when it was placed in the suspend state, the resume signaling must be initiated with a high-speed idle sequence. The controller of the host system 1 must additionally ensure a 10 ms resume recovery time (TRSMRCY) before the peripheral devices 2 to be awakened can be accessed.

As soon as the host system 1 initiates the resume state by a change of level on the data lines D+ and D−, this is detected by the monitoring circuit 7 and evaluated by the control circuit 8. Then the supply voltage is again connected to the second terminal 13 via the second switching element 18, and the pull-up resistors 16a and 16b are disconnected from the data lines D+ and D−. The optional interruption circuit 20 is then also disconnected if needed to restore a connection between the first terminal 12 and the second terminal 13. In this example, this takes place synchronously with the deactivation of the transistors 17a and 17b so that an interruption-free takeover by an internal pull-up resistor of the device takes place and thus no device disconnection is triggered. Thereafter, the peripheral device 2 returns from the suspend state to the normal operational state, taking into account the time requirements of the USB specification.

Figure 5:
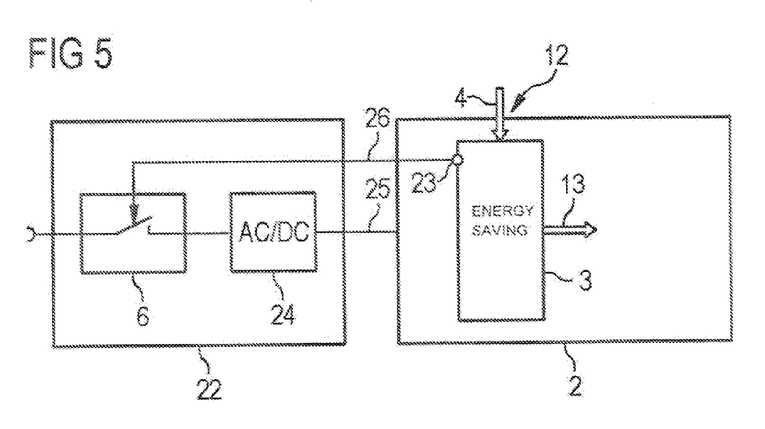
FIG. 5 shows a first peripheral device with an external power adapter for supplying power.

FIG. 5 shows a peripheral device 2 with an external power supply unit 22. The peripheral device 2 in accordance with FIG. 5 comprises an energy-saving circuit 3. The energy-saving circuit 3 is constructed similarly to the energy-saving circuit 3 shown in FIG. 2, and provides a control signal to the peripheral device 2 via a control signal output 23. The control signal from the control output 23 is used to interrupt a supply of power to the external power supply unit 22. For this purpose, the power supply unit 22 comprises a first switching element 6 for disconnecting a converter circuit 24 from a power supply grid. The power supply unit 22 and the peripheral device 2 are connected to one another via a supply line 25 for transmitting a DC voltage. In addition, they are connected to one another by an additional control line 26 for transmitting the control signal from the control output 23 to the first switching element 6 of the power supply unit 22.

Alternatively, the control signal of the control output 23 can be modulated onto the supply line 25 for transferring the supply voltage. For example, a high-frequency AC voltage signal can be modulated onto a supply DC voltage.

Figure 6:
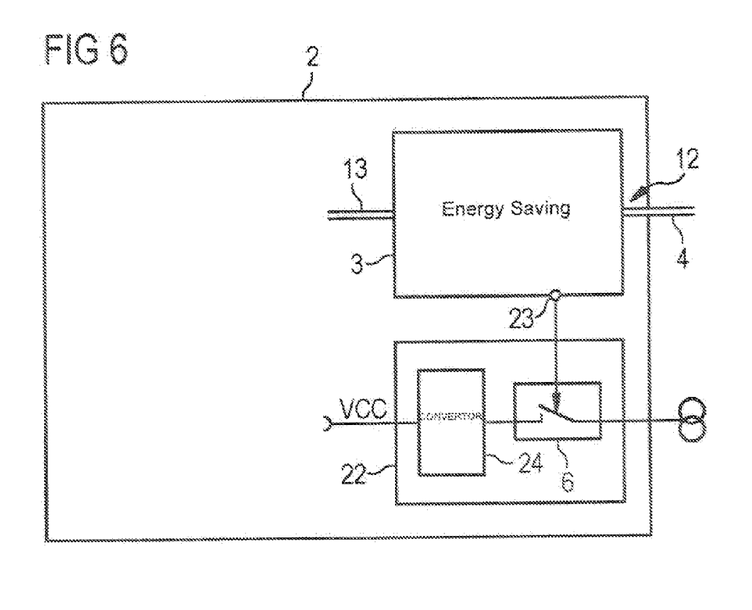
FIG. 6 shows a second peripheral device with an integrated power supply unit.

FIG. 6 shows a peripheral device 2 with an internal power supply unit 22. The mode of operation of the peripheral device 2 according to FIG. 6 largely corresponds to that of the peripheral device 2 in FIG. 5. Since the power supply unit 22 in FIG. 6 is integrated into the peripheral device 2, however, it is possible to do without an external connection between the peripheral device 2 and the power supply unit 22, which particularly facilitates the controlling of the first switching element 6 of the power supply unit 22.

Figure 7:
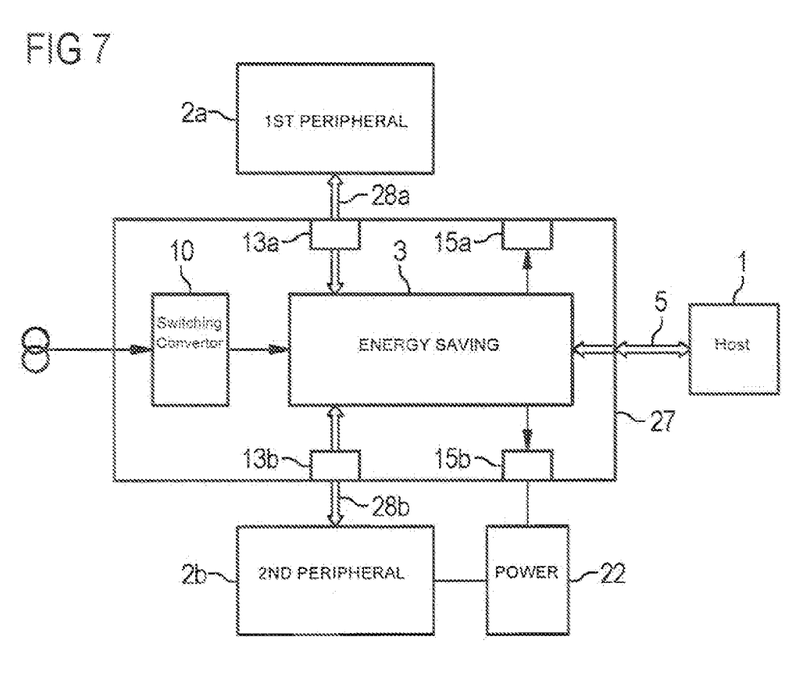
FIG. 7 shows a schematic representation of a switching device with an integrated energy-saving circuit.

FIG. 7 shows a switching device 27 for connection of peripheral devices 2a and 2b to a common host system 1. The first peripheral device 2a is remotely supplied from the switching device 27 with operating energy via a data bus. For this purpose, the first peripheral device 2a is connected to the switching device 27 with a bus line 28a, which comprises both data lines and supply lines. The second peripheral device 2b is supplied with an operating energy by an external power supply unit 22. This second peripheral device 2b is connected via a second bus line 28b to the switching device 27. In addition, the power supply unit 22 is connected to a switching output 15b of the switching device 27. This can be, for example, a switchable socket that is associated with a second terminal 13b for the peripheral device 2b.

The switching device 27 comprises an energy-saving circuit 3 constructed similarly to those described previously. In particular, the energy-saving circuit 3 monitors the communication between the host system 1 and the peripheral devices 2a and 2b. If no data is being transferred from the host system 1 to the peripheral devices 2a or 2b, the first peripheral device 2a or the second peripheral device 2b is disconnected from an energy supply. In the case of the peripheral device 2a supplied via the switching device 27, only a supply line of the bus line 28a is interrupted, as described with reference to FIG. 4, for example. In the case of the second peripheral device 2b, the switching output 15b, configured as a socket, of the switching device 27 is deactivated so that the power supply unit 22 is cut off from the power supply grid.

If all peripheral devices 2 connected to the switching device 27 are disconnected from the power supply grid, then the switching converter 10 of the switching device 27 can also be disconnected from the energy supply grid. In this case, the energy-saving circuit 3 is supplied with an operating energy as described above, either by the host system 1 or from an internal energy store of the switching device 27.

Figure 8:
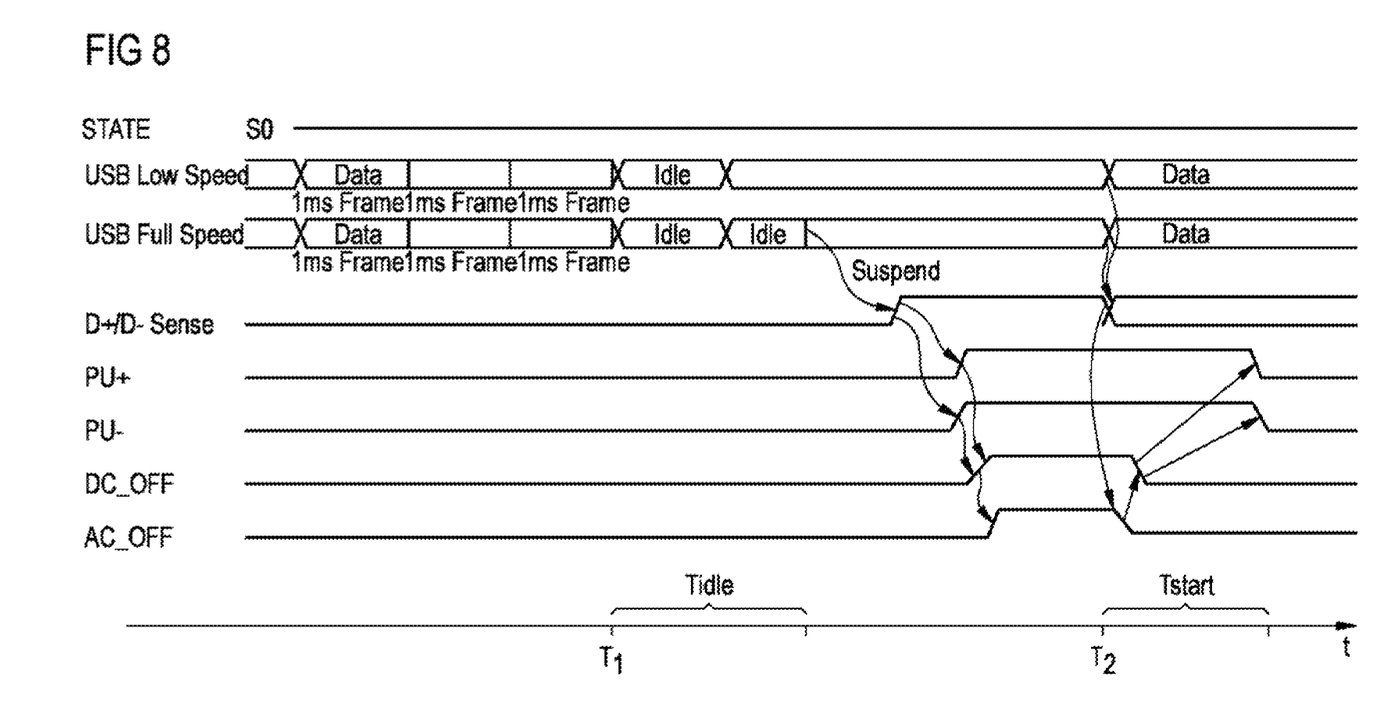
FIG. 8 shows a schematic representation of bus signals.

FIG. 8 shows an example for signaling an idle state via a USB bus. A host system 1, a personal computer, is in a normal operating condition, for example, the so-called "ACPI" operating state S0. Initially, a data transfer is taking place via differential data lines D+ and D− of a USB bus. As long as data is being interchanged with a peripheral device 2, data packets are transmitted with a frame period of one millisecond via the data lines D+ and D−, either according to the USB low-speed standard or according to the USB full-speed standard If no more data is to be exchanged between the host system 1 and the peripheral device 2, the host system 1 signals an idle state at a time T1. In this state, neither data nor control signals are sent via the data lines D+ and D−. In particular, not even so-called start-off-frame (SOF) packets are sent via the data bus in this operating state.

After a predetermined idle time Tidle of at least 3 ms, the energy-saving circuit 3 recognizes that activity is no longer taking place on the data bus. Then, depending on a previously determined transmission mode, it pulls either the positive data line D+ or the negative data line D− to a predetermined voltage level. Thereafter, a corresponding control signal for interrupting a primary power grid voltage and/or a secondary AC voltage of a supply line in the data bus is generated. In this manner, it is ensured that the peripheral device 2 no longer consumes any energy in the idle state of the bus system.

If it is recognized at a later point in time T2 that a communication via the data bus is to be continued from the host system 1, the peripheral device 2 is again connected to the data bus. For this purpose, the energy-saving circuit 3 first recognizes a resumption of signaling via the data bus. For example, an explicit resume signal is provided by the host system 1. Alternatively, a recognition of data packets prefixed with an SOF signal is possible. Thereupon, the control circuit 9 first activates the first switching element 6 and/or the second switching element 18 to provide a power grid voltage to a power supply unit 22 or a supply voltage via a supply line of the data bus. The peripheral device 2 starts up and is again in an operable state within a predetermined time span Tstart. Thereupon the holding circuit 8 is deactivated by taking back the corresponding control signals for pulling up the positive data line D+ or the negative data line D−.

Subsequently, the data is processed by the peripheral device 2 and a communication with the host system 1 is continued. In this case, there is not a new device recognition or a recognition of a disconnection and a reconnection of the peripheral device 2 to the host system 1. Accordingly, the host system 1 does not generate a corresponding interrupt that is normally evaluated by an operating system of the host system 1 upon connection of additional peripheral devices 2.

Figure 9:
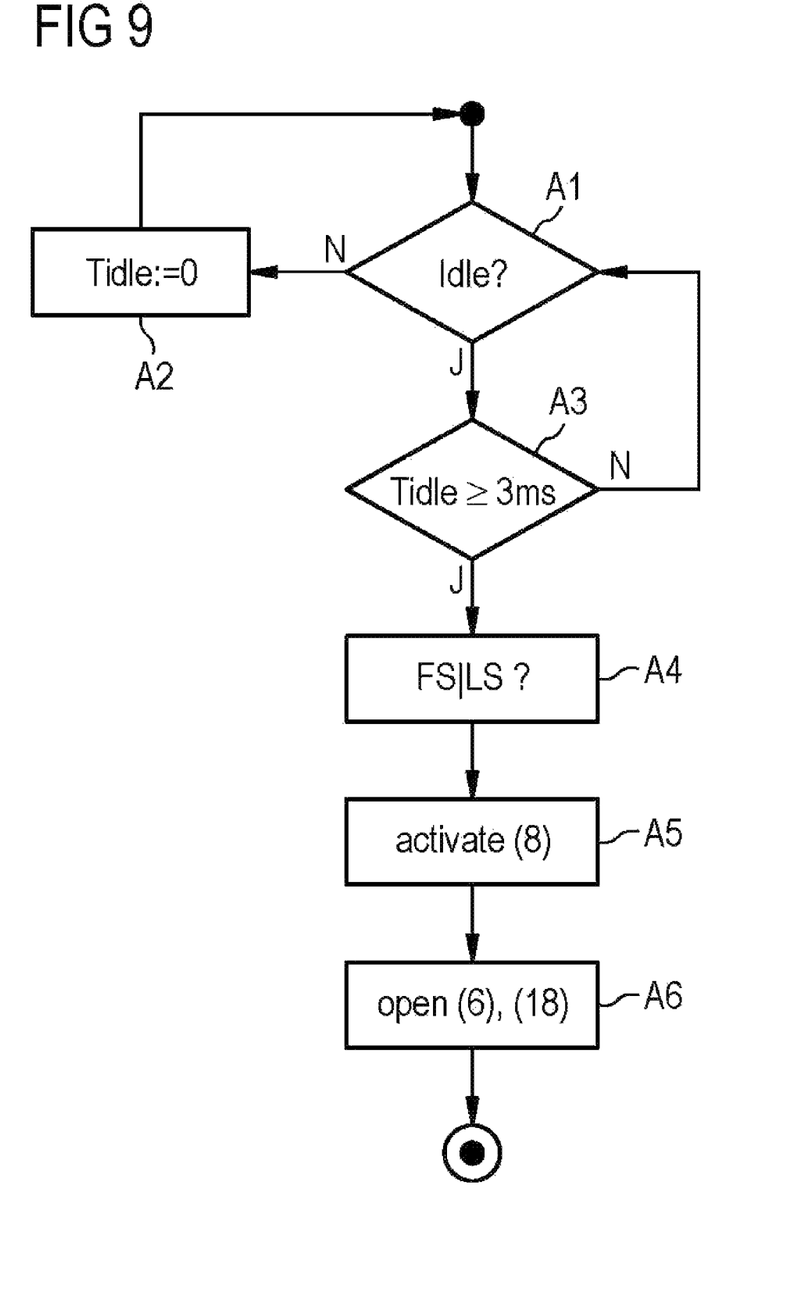
FIG. 9 shows a flow chart of an operation method for an energy-saving circuit.

FIG. 9 shows a flow chart of an operating method for an energy-saving circuit 3.

In a first step A1, a loop monitors whether the bus system is in an idle state. If the bus system is not in the idle state, a timer for determining an idle state time is reset in a step A2. The steps A1 and A2 are repeated until an idle state is recognized.

If the bus system is in an idle state, it is checked in a subsequent step A3 whether a predetermined time span for the presence of the idle state has been reached. For example, it is checked whether a USB bus has been in an idle state for more than 3 ms. If this is not the case, the process is continued in step A1.

If the predetermined idle time has been reached, a connection state of a peripheral device 2 is recognized in a step A4. For example, it is recognized whether a peripheral device 2 is communicating with a host system 1 in a low-speed or in a full-speed operating mode. A special monitoring for the use of a high-speed operating mode is not necessary because peripheral devices that communicate in the high-speed operating mode first change back into the full-speed operating mode before the transition to an idle state.

In a step A5, a holding circuit 8 is first activated. For example, a resistor 16 is connected by a transistor 17 between a data line and a supply line to draw the data line to a predetermined voltage level.

In a subsequent step A6, a switching element 6 and/or a second switching element 18 is opened to stop a supply of power to the peripheral device 2. The peripheral device 2 therefore no longer consumes any electrical energy from the power supply grid.

The described characteristics of the individual configurations described above can be combined with one another in numerous manners. The energy-saving circuit 3 is suitable for integration into individual devices, as a separate add-on circuit between a host system 1 and a peripheral device 2 and for arrangement in switching components such as a USB hub or switch.

The described solution is suitable for other bus systems besides the USB bus that allow recognition of an idle state. It is preferably suited to bus systems that comprise a supply line that allows a supplying of the energy-saving circuit 3 via the bus system even for switched-off peripheral devices. Other examples of such bus systems are eSATA, Firewire (IEEE 1394), external PCI-Express and Power over Ethernet (PoE, IEEE 802.3af).

An energy savings can be improved by further controlling a host-side control of the bus system. For example, the duration of inactivity of an individual device after which either the entire bus system or individual peripheral devices 2 that are connected to the bus system should be put into a suspend state can be specified in an operating system. The host system 1 is preferably configured in such a manner that, when switching into energy-saving states such as an ACPI S3, S4 or S5 state, it puts the data bus into an idle state as a matter of course so that peripheral devices 2 connected to the data bus transition together with the host system 1 into an energy-saving state.

Signaling the idle state is not tied to a specific protocol layer. Alternatively, a supply line of the data bus is also deactivated in an energy-saving state of the host system 1. If the monitoring circuit 7 recognizes a deactivation of a supply voltage on one of the supply lines, this can also be used to recognize an idle state and for subsequent deactivation of a peripheral device 2.

What is claimed is:

1. An energy-saving circuit for a peripheral device that connects to a data bus of a host system, comprising:
   a monitoring circuit that monitors a communication via the data bus;
   a holding circuit that holds a connection state of the peripheral device;
   at least one switching element that interrupts a supply voltage for the peripheral device; and
   a control circuit that recognizes by the monitoring circuit at a beginning of an idle state of the data bus, holds the connection state of the peripheral device by activating the holding circuit upon recognition of the idle state, and interrupts the feeding of a supply voltage for the peripheral device by opening the at least one switching element.

2. The circuit according, to claim 1, wherein the control circuit further recognizes an end of the idle state of the data bus by the monitoring circuit to restore the feeding of the supply voltage for the peripheral device by closing the at least one switching element upon recognition of the end of the idle state, and releases the connection state of the peripheral device by deactivating the holding circuit.

3. The circuit according to claim 2, wherein the holding circuit comprises a signaling component that generates at least one control signal during the idle state of the data bus.

4. The circuit according to claim 1, wherein the holding circuit comprises a signaling component that generates at least one control signal during the idle state of the data bus.

5. The circuit according to claim 4, wherein the data bus comprises at least one reference line that provides a predetermined voltage level and at least one data line, and the signaling component comprises at least one resistor and connects the at least one data line via the resistor to the at least one reference line.

6. The circuit according to claim 5, wherein the holding circuit comprises one resistor and one switching element for each data line, the resistor and the switching element are connected in series between the reference line and one data line respectively, and each switching element couples the resistor between the data line and the reference line on receiving the control signal during the idle state of the data bus starting at the beginning of the idle state.

7. The circuit according to claim 1, wherein the host system can transfer data via the data bus at least at a first and a second speed, and that the connection state of the peripheral device determines whether the peripheral device is arranged for data transmission at the first or the second speed.

8. The circuit according to claim 7, wherein the data bus comprises at least one first data line and at least one second data line, and the holding circuit holds the first data line at a predetermined voltage level if the peripheral device is set up for data transmission at the first speed, and holds the second data line at a predetermined voltage level if the peripheral device is set up for data transmission at the second speed.

9. The circuit according to claim 1, wherein the peripheral device has a power supply unit with a converter circuit to provide a secondary supply voltage from a primary supply voltage of an energy supply grid, and the at least one switching element disconnects the convertor circuit from the energy supply grid.

10. The circuit according to claim 1, wherein the data bus comprises at least one supply line that provides a supply voltage to the peripheral device, and the at least one switching element disconnects the peripheral device from the at least one supply line of the data bus.

11. The circuit according to claim 10, wherein the energy-saving circuit is supplied via the supply line of the data bus with a supply voltage.

12. The circuit according to claim 1, wherein the data bus has at least one data line and the energy-saving circuit comprises an interruption circuit that interrupts the at least one data line, wherein the control circuit interrupts the at least one data line upon recognition of an idle state.

13. The circuit according to claim 1, wherein the data bus is a serial USB data bus.

14. The peripheral device according to claim 1, wherein the energy-saving circuit is arranged electrically between a terminal and a host system component and the peripheral device comprises the terminal that couples the peripheral device to the host system; and the host system component which provides a device function of the peripheral device in an operating state.

15. A switching device comprising:
   at one energy-saving circuit according to claim 1;
   at least one first terminal that couples the switching device to the host system; and
   at least one second terminal that couples the switching device to the peripheral device;
   wherein the at least one energy-saving circuit is arranged electrically between the first terminal and the second terminal.

16. The switching device according to claim 15, wherein at least one switching converter provides an operating voltage for the switching device and supplying peripheral devices connected to the switching device, wherein the energy-saving circuit interrupts, upon recognition of the idle state, the supply to peripheral devices that can be supplied by the switching converter.

17. An operating method for an energy-saving circuit arranged between a host system and a peripheral device according to claim 1, comprising:
   determining the connection state of the peripheral device;
   recognizing the idle state of the data bus by monitoring the data bus;
   holding the connection state of the peripheral device by providing a control signal for the host system; and
   disconnecting a power supply line assigned to the peripheral device by opening at least one switching element.

* * * * *

UNITED STATES PATENT AND TRADEMARK OFFICE
CERTIFICATE OF CORRECTION

PATENT NO.        : 8,527,798 B2                           Page 1 of 1
APPLICATION NO.   : 12/900570
DATED             : September 3, 2013
INVENTOR(S)       : Kastl et al.

It is certified that error appears in the above-identified patent and that said Letters Patent is hereby corrected as shown below:

In the Claims

In Column 11

At claim 1, line 10, please delete "at".

Signed and Sealed this
Third Day of June, 2014

Michelle K. Lee
*Deputy Director of the United States Patent and Trademark Office*